Nov. 14, 1950 — E. T. DAVIS — 2,530,326
ELECTRICAL CONTROL SYSTEM AND APPARATUS
Filed June 28, 1947 — 5 Sheets-Sheet 1
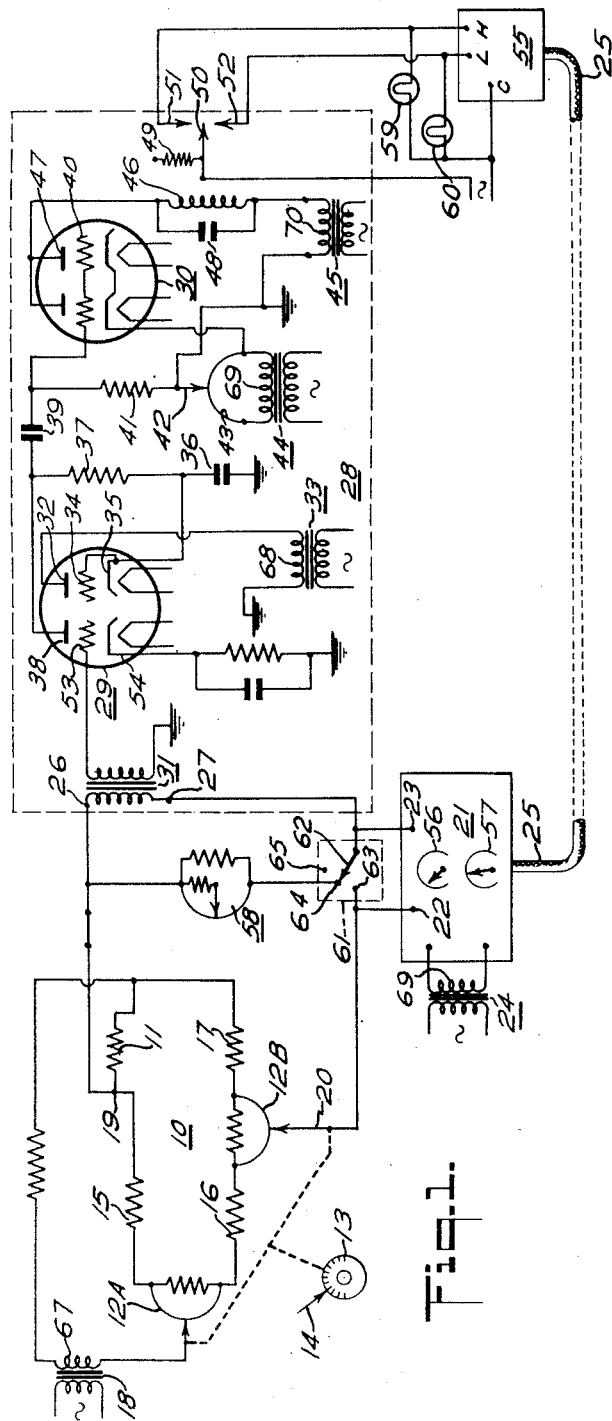
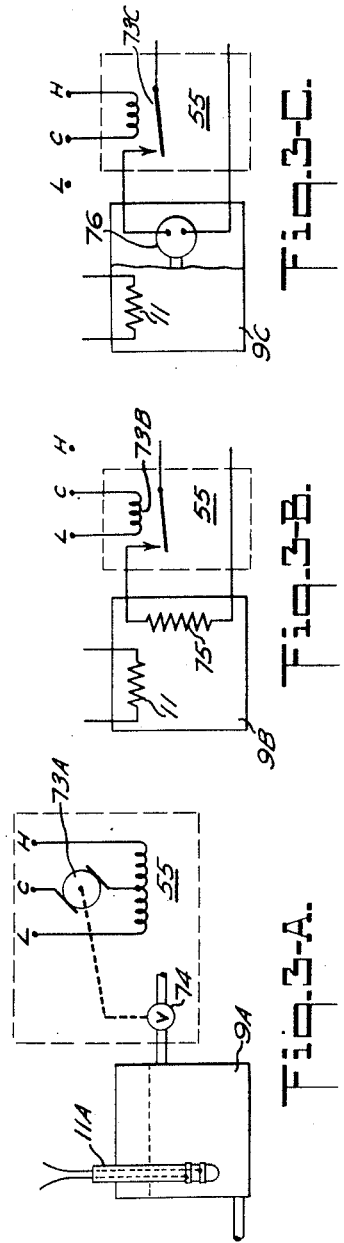
INVENTOR
ELWOOD T. DAVIS
BY Woodcock and Phelan
ATTORNEYS Nov. 14, 1950 E. T. DAVIS 2,530,326
ELECTRICAL CONTROL SYSTEM AND APPARATUS
Filed June 28, 1947 5 Sheets-Sheet 2

INVENTOR
ELWOOD T. DAVIS
BY
Woodcock and Phelan
ATTORNEYS

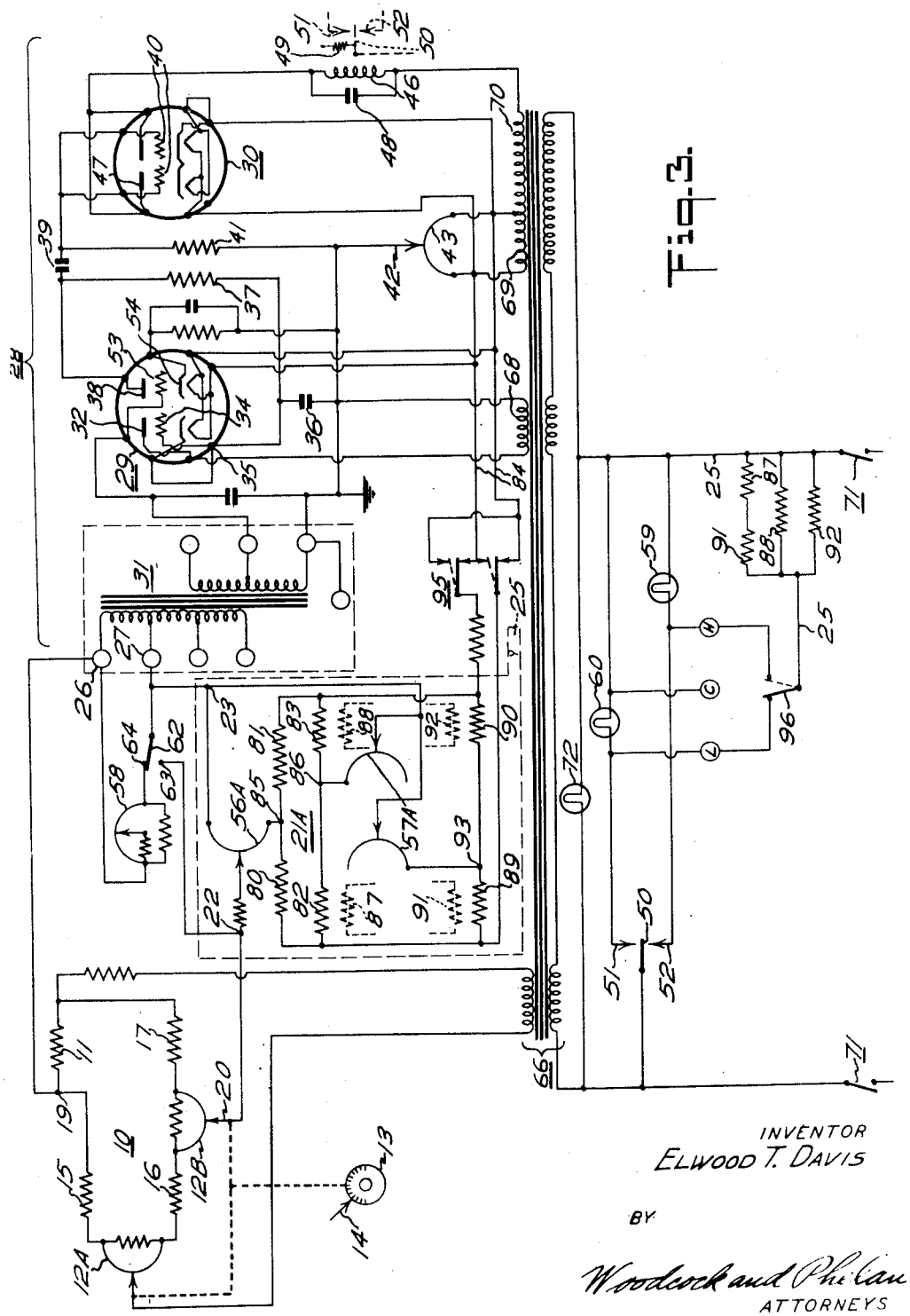

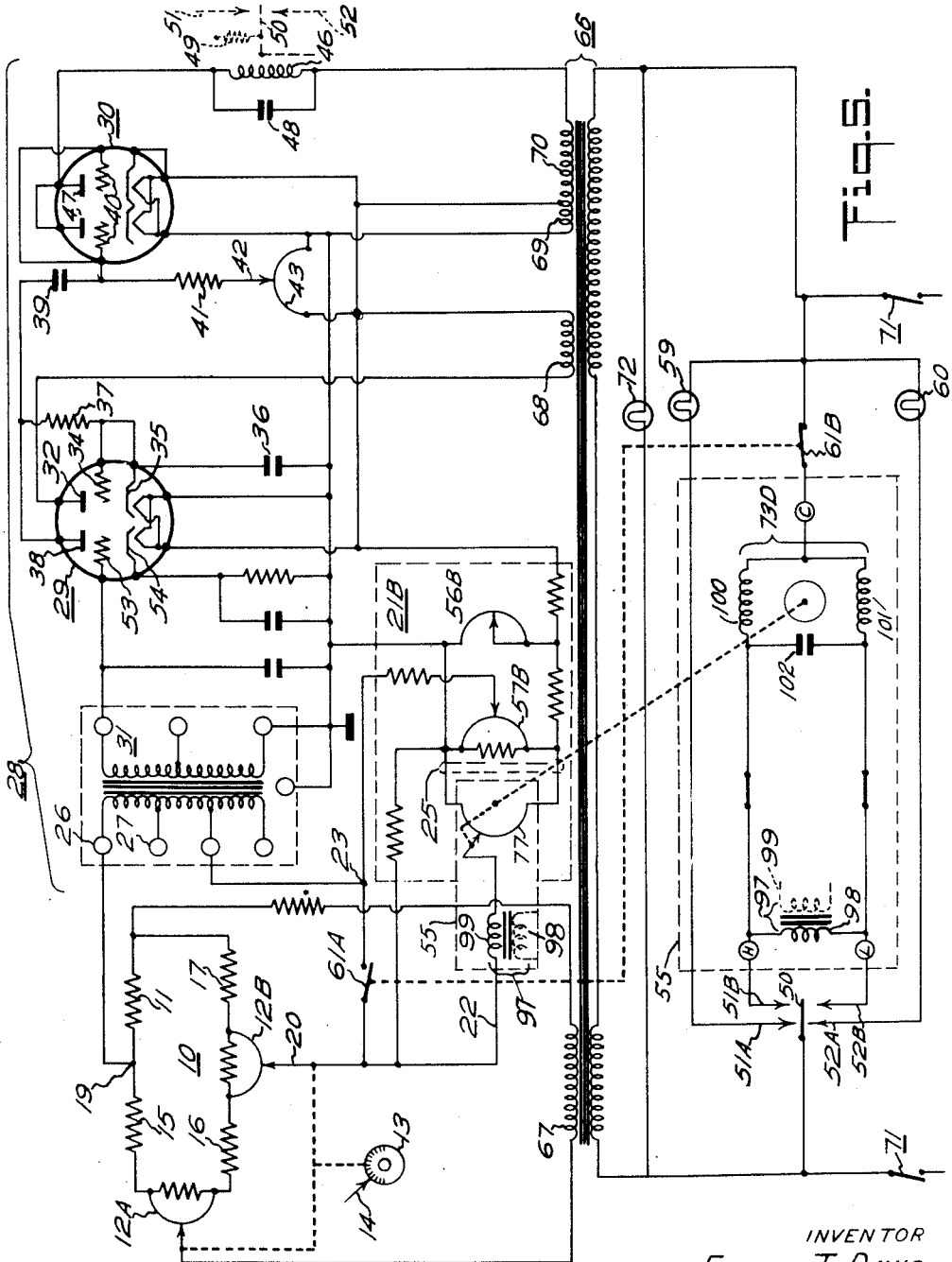

Nov. 14, 1950     E. T. DAVIS     2,530,326
ELECTRICAL CONTROL SYSTEM AND APPARATUS
Filed June 28, 1947     5 Sheets-Sheet 5
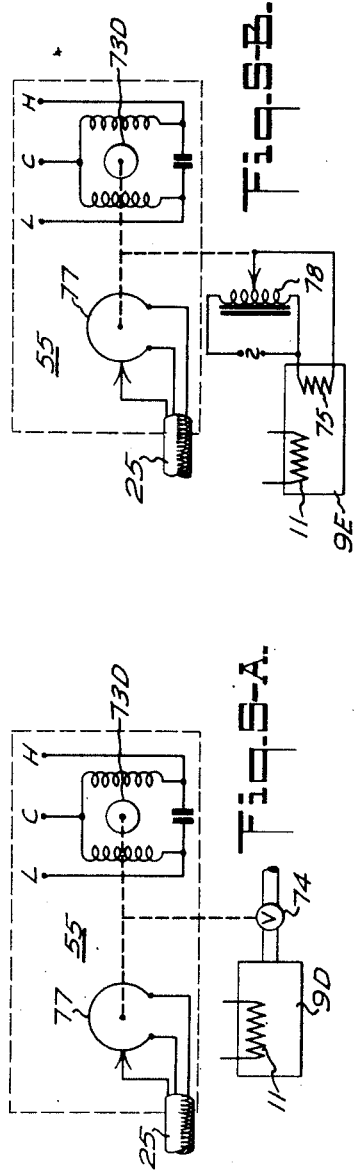
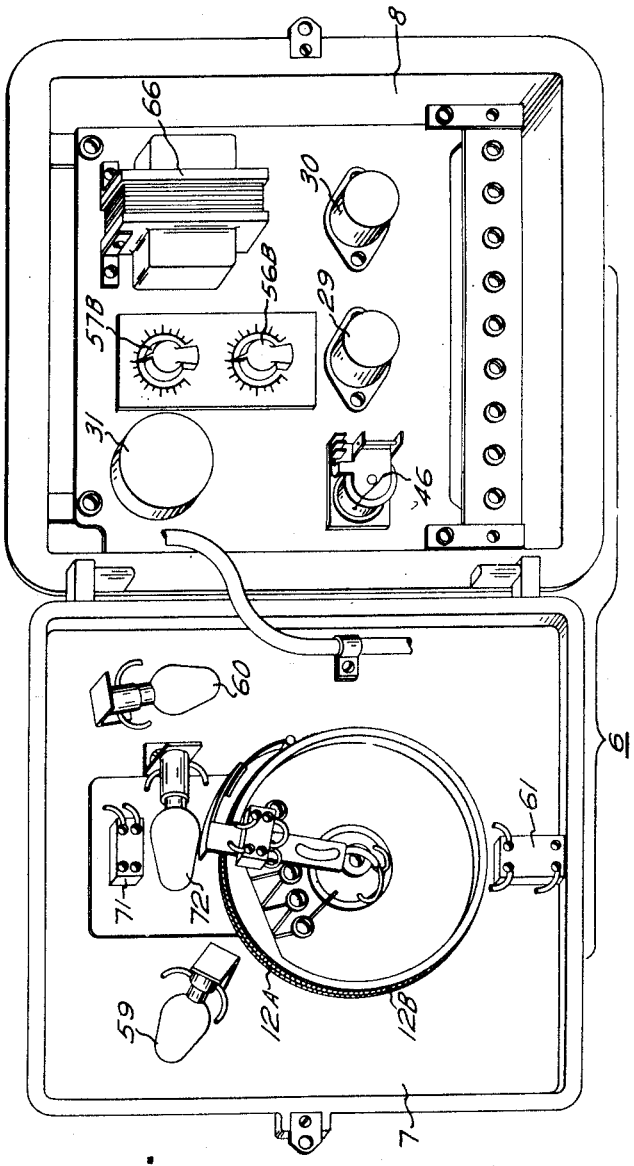
INVENTOR
*Elwood T. Davis*
BY
*Woodcock and Phelan*
ATTORNEYS Patented Nov. 14, 1950

2,530,326

UNITED STATES PATENT OFFICE 2,530,326

ELECTRICAL CONTROL SYSTEM AND APPARATUS

Elwood T. Davis, Brookline, Mass., assignor to Leeds and Northrup Company, Philadelphia, Pa., a corporation of Pennsylvania Application June 28, 1947, Serial No. 757,745

14 Claims. (Cl. 318—28)

1

This invention relates to electrical systems and apparatus for automatically varying the input to a process to maintain a condition thereof at or near a desired magnitude.

In accordance with the present invention, a measuring network whose unbalance voltage is representative of departure from a desired magnitude of the controlled condition, such as the temperature, conductivity or the like of a process, is connected in series with a second network, whose unbalance voltage is representative of the control action, and the resultant voltage is applied to a sensitive detector which through a suitable contactor, motor or the like, controls the input to the process and which also controls the action of the aforesaid second network.

Further in accordance with the invention, the detector controls electric signal devices, preferably lights of different color, whose blinking, continuous illumination or darkness, enables an operator to follow the operation of the controller and the condition of the controlled process.

Further in accordance with the invention, the operator may accurately measure the magnitude of the controlled condition by temporarily effectively removing or disabling the aforesaid second network and adjusting a calibrated impedance of the measuring network to effect balance thereof as indicated by the signal lights.

The invention further resides in features of construction, combination and arrangement hereinafter described and claimed.

Figure 2:
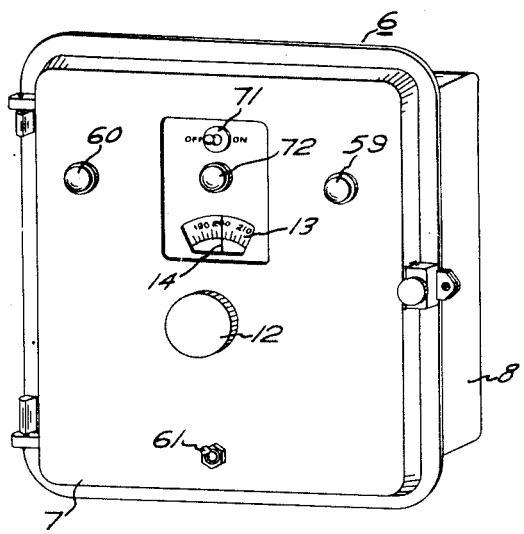
Figure 4:
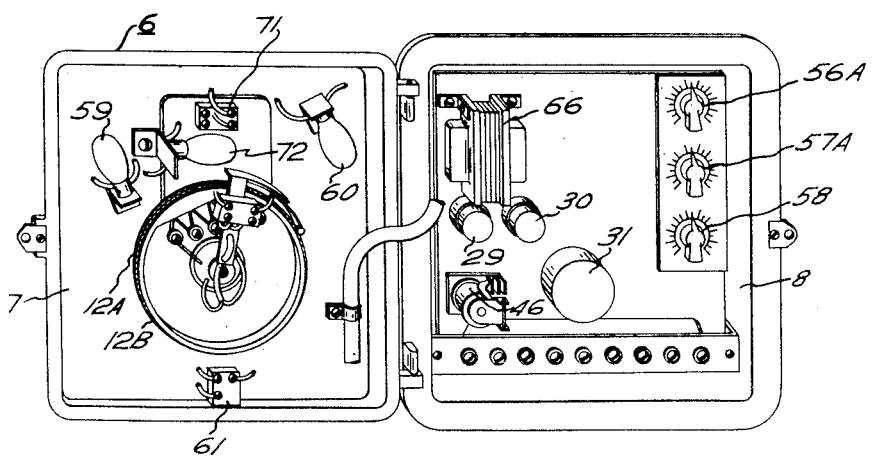

For a more detailed understanding of the invention and for illustration of preferred forms thereof, reference is made to the accompanying drawings, in which:

Fig. 1 schematically illustrates a control system embodying the invention;

Fig. 2 is a perspective view of a control unit housing components of the systems shown in Figs. 1, 3 and 5;

Fig. 3 schematically illustrates a control system generically similar to that of Fig. 1;

Figs. 3—A, 3—B and 3—C are referred to in discussion of the use of the system of Fig. 3 for different controlled processes;

Fig. 4 is a front view of the control unit of Fig. 2 with the door opened to expose components of the system of Fig. 3;

Fig. 5 schematically illustrates another control system generically similar to that of Fig. 1;

Figs. 5—A and 5—B are referred to in discussion of various uses of the system of Fig. 5; and Fig. 6 is a front view of the control unit of Fig. 2 with the door opened to expose components of the system of Fig. 5.

Referring to Fig. 1, the network 10 includes an element 11 for producing an electrical effect which varies in accordance with the magnitude of a condition to be controlled. For brevity in the subsequent discussion, it will be assumed that the network is responsive to changes in temperature, in which case the element 11 may be a resistor of platinum or like conductive material characterized by variation of its electrical resistance with temperature. The temperature at which the network 10 is in balance can be preset: specifically, an operator may adjust knob 12, Fig. 2, to set the slidewires 12A, 12B with respect to their associated contacts to a particular reading of scale 13 with respect to index 14. In the particular form shown, the measuring network is a Wheatstone bridge, generally of the type shown in Letters Patent No. 1,097,651 to Leeds, including in addition to the slidewires 12A, 12B the fixed resistors 15, 16 and 17. The input voltage of the bridge 10 is supplied from a suitable source of alternating current exemplified by the secondary of transformer 18.

Upon deviation of the temperature from the desired magnitude corresponding with the setting of scale 13, there is produced across the output terminals 19—20 of the bridge a voltage whose magnitude is dependent upon the extent of the temperature deviation and whose phase with respect to the applied input voltage of the bridge depends upon whether the temperature is high or low with respect to the scale setting. A second network, generically represented by the block 21, produces across its output terminals 22—23 a voltage which is representative of the average input of the agent which is varied as hereinafter described in sense to restore the temperature or other condition toward its desired magnitude. Two specific forms of network 21 are shown in Figs. 3 and 5 and are later discussed in detail. The input voltage of network 21 is supplied from a suitable source generically represented by the secondary of transformer 24. The cable 25 extends from control apparatus, later described, to inject into the network 21 an electrical effect of phase and magnitude dependent upon the control action. The resultant of the two voltages of the networks 10 and 21 is applied to the input terminals 26, 27 of a suitable detector 28 which in the particular system disclosed comprises the tubes 29 and 30 which amplify the resultant voltage as impressed upon an input transformer 31 of the detector.

The tube 29 has one section which is used as a rectifier for supplying the anode current of the amplifier section of the tube. More particularly, the anode 32 of the rectifier section is connected to one terminal of a suitable source of alternating current generically represented by the secondary 68 of transformer 33 and the grid 34 and cathode 35 of the same section are connected through the output resistor 37 to the anode 38 of the amplifier section 38, 53, 54 of the tube. The rectified current flows through the rectifier section 32, 34, 35, through the coupling resistor 37, through the amplifier section 38, 54, and thence to the other and grounded terminal of the secondary of transformer 33 through a cathode-resistor network. The filter condenser 36 is connected between that grounded terminal and cathode 35 of the rectifier section. The amplifier anode 38 is coupled as by the coupling condenser 39 to the grids 40 of tube 30 in the second amplifier stage. The input circuit of tube 30 includes a grid resistor 41, one terminal of which is connected to the grids 40 and the other terminal of which is connected to the movable contact 42 of a potentiometer 43 connected across a suitable source of alternating current generically represented by the secondary 69 of transformer 44. The anode current for the tube 30 is supplied from a suitable source of alternating current generically represented by the secondary 70 of a transformer 45 connected between the anodes 47 of tube 30 and the adjustable contact 42 of potentiometer 43. In the anode circuit of the tube 30 is included the winding 46 of a relay which in the particular form shown is provided with a movable contact 50 biased by spring 49 toward engagement with a fixed contact 51. The movable contact 42 of potentiometer 43 may be so set or adjusted that under conditions of zero signal to the input terminals 26, 27 of detector 28, the anode current of tube 30 is of magnitude maintaining the relay contact 50 out of engagement with either of the fixed contacts 51 and 52: for "fail-safe" operation, the contact 42 is slightly displaced from the aforesaid setting so that under condition of zero signal as applied to the final amplifier tube, that relay contact is closed which insures the control operates in a "safe" direction. With "fail-safe" operation, for correct indication of the control point, a compensating offset must be made, either in the network 10 itself or in the indicator system 13, 14. The smoothing condenser 48 in shunt with coil 46 substantially eliminates chattering of the relay contacts.

For the moment assuming no fail-safe adjustments have been made, when the input voltage applied to the input terminals 26, 27 of the detector is not zero, the contact 50 of the relay moves into engagement with one or the other of contacts 51, 52 depending upon the phase relation between the input voltage as applied to grids 40 and the voltage applied to the anodes 47. The relay contacts are used as a switch for controlling the supply of an agent to a process whose condition, such as temperature, is to be controlled by a controller 55 and also more directly to inject into the network 21 a control effect modifying the output voltage of that network. In manner later specifically described, the control effect of network 21 may be modified by changing the setting of control elements 56 and 57. The sensitivity of the detector may effectively be varied by adjustment of the variable impedance 58 in shunt with the input terminals 26, 27 thereof.

The relay contacts also control the signal lights 59, 60 or equivalent signal devices. Assuming that the minimum and maximum limits of the range within which the agent may be varied are sufficient to enable the controller to maintain the temperature or other condition at or near the desired value under the load conditions encountered, the movable contact 50 may remain in its central position for which neither of the signals 59, 60 are energized, or it may intermittently engage one or the other of the contacts 51, 52 to afford an intermittent signal, depending upon the type of associated control equiment, as will hereinafter appear. If, however, the maximum limit of the agent supply is too low for the existing demand or the minimum limit is too high for the existing demand, the corresponding signals 59 or 60 will be continuously energized, warning the operator that for proper control either the agent supply or the demand must be changed. By way of example, if the valve of a gas-fired furnace is set to operate between certain minimum and maximum openings and the heating value of the gas should fall, the continuous illumination of the green light 60 would indicate the need either to reduce the load or to increase the available maximum rate of supply of the gas, as by further opening a valve in a by-pass line. Conversely, if the minimum rate of supply is too high, the continuous energization of the red light 59 indicates to the operator the need either to increase the load or further to reduce the minimum rate of supply as by further closing of the by-pass valve. If the control action is excessive resulting in large amplitude oscillation of the temperature about the control point, this cycling may be minimized by re-setting the throttling range control 56.

Moreover, the operator may at any time accurately measure the existing magnitude of the condition by operating the check switch 61 effectively to remove the output voltage of network 21 as a component of the input signal voltage applied to the detector. Specifically in the system shown, this removal is effected by moving the contact 62 of switch 61 into engagement with the fixed contact 63 effectively to short-circuit the output of network 21. Alternatively, the removal could be effected by removal of the power supplied to network 21 through transformer 24. With network 21 so temporarily disabled, the operator adjusts the knob 12 of the variable impedances 12A, 12B, or equivalent, to rebalance the network 10, as indicated by darkness of both lights 59, 60, or by deenergization of the equivalent signal devices. The existing magnitude of the condition may then be read from the relative position of the scale 13 and index 14. If the temperature, for example, so measured corresponds with the temperature it is desired to maintain, the check switch 61 is released for return to its original position to permit resumption of control without modification. If it is not possible with the check switch 61 in measuring position to obtain darkness of both signal lights for any setting of knob 13, the continued energization of one of the lights 59, 60 indicates that the system has failed "safe" under control of the potentiometer 43.

In the modification shown in Fig. 3, the elements having the same purpose and function as elements shown in Fig. 1 are identified by the same reference characters. In general, the network 10, as in Fig. 1, is responsive to the changes in magnitude of some controlled condition, as temperature, pressure, conductivity or the like, to produce an output voltage which jointly with the output voltage of the second network 21A is applied to the detector 28. In the network 21A, generically corresponding with block 21 of Fig. 1, the resistors 80, 81, 82 and 83 form the arms of a Wheatstone bridge, one pair of whose terminals are connected by leads 84 to a suitable source of alternating current such as the secondary winding 69 of a transformer 66. Assuming the bridge 80—83 to be in balance, the points 85, 86 are of the same instantaneous potential, and, accordingly, the output voltage of the network 21A is zero. With the resistors 82 and 83, there are respectively associated the heaters 87 and 88 which are energized, in the particular system shown, so long as the contacts 51 and 52 of the detector relay remain in engagement. For simplicity of explanation, it is assumed that all of the resistors 80 to 83 have the same "cold" resistance and that the thermal inertia of the unit comprising resistor 82 and its heater 87 is small, and only slightly more than the thermal inertia of the unit comprising resistor 83 and its heater 88. Accordingly, upon closure of the relay contacts 50 and 51, the effective magnitudes of resistors 82 and 83 change rapidly at somewhat different rates until the unbalance of the bridge 80—83 is substantially equal and opposite to that of network 10, whereupon the relay contacts 50 and 51 separate to deenergize the heaters with consequent rapid decrease in the effective magnitude of resistors 82, 83 at somewhat different rates. The control network 21A accordingly provides a throttling action insuring the average heat input, for example, to the controlled process is varied in accordance with the temperature variations by varying the ratio of the durations of the periods of activity and inactivity of the process control device which is energized concurrently with heaters 87, 88, 91 and 92 of network 21A.

If the temperature, for example, falls below the control point, the bridge 10 is unbalanced and the first control effect is that of the thermal unit 83, 88 of network 21A which produces an opposing unbalance increasing the ratio of the active to the inactive control periods. As the slower unit 82, 87 heats up, due to increased duration of the active control periods, it begins to counteract the rebalancing effect of thermal unit 83, 88 with the result the unit 83, 88 must be heated to still higher temperature to offset the unbalance of bridge 10 so further to increase the ratio of the active to the inactive control periods. This increase of percent "on" time continues so long as the temperature remains below the control point and the speed with which it increases is proportional to the deviation from the control point. Only when the temperature returns to the control point will equilibrium be reestablished between the fast and slow thermal units and the per-cent "on" time remain constant.

This automatic droop correction makes it possible for the process temperature to be controlled at the control point despite variations in the load demand provided the available input is sufficienly great to meet the maximum demand.

To afford selection of different rates of droop correction, the network 21A is provided with a second pair of thermal units 89, 91 and 90, 92. The "cold" resistances of resistors 89 and 90 are equal to each other and may for simplicity be assumed to be the same as that of resistors 80, 81. The thermal inertia of unit 89, 91 is large and substantially greater than the thermal inertia of the thermal unit 90, 92. Thus, by adjustment of slidewires 57A, the rate of the droop correction automatically effected by network 21A may be varied over a substantial range.

The extent to which the droop correction action should be introduced depends upon the characteristics of the process.

By way of example, the system of Fig. 3 may be used to control the acidity of a pickling bath, in which case the responsive element of the network 10 may be a conductivity cell 11A (Fig. 3A) immersed in pickling liquid in the tank 9A. The flow of a reagent, such as acid, to the tank may be controlled by a valve 74 suitably mechanically coupled to the armature of a motor 73A, or equivalent electromechanical device comprised in controller 55. In this particular modification, the motor is of the split field type whose terminals are connected to the terminals L, C and H of the controller 55, Fig. 3. Assuming the liquid within the tank 9A is of conductivity corresponding with the pre-set balance point of network 10 and that the output voltage of network 21 is zero, the movable contact 50 of the detector relay 46 is in its intermediate position out of engagement with the fixed contacts 51 and 52. Upon departure in one sense or the other of the conductivity of the bath from the pre-set control point, the unbalanced voltage of the network 10 is applied to the detector 28 and the movable contact 50 of the relay engages one or the other of the contacts 51—52 of the motor 55 to change the setting of valve 74 from one limit to the other in proper direction to return the concentration toward the control point. Upon closure of the contacts 50 and 52 to effect the valve-adjusting actuation of motor 55, the heater coils 87, 88, 91, 92 are energized to unbalance the control network 21A in sense to oppose the unbalance of network 10, so that in subsequent operation of the controller, the input voltage of the detector 28 is, as described in connection with Fig. 1, the resultant of the output voltages of the networks 10 and 21A.

In order that the heaters 87, 88, 91 and 92 may be energized when the valve 74 is open, the switch 96 is thrown to the full-line position shown in Fig. 3; that the output voltage of network 21A may be of proper instantaneous polarity to oppose the output voltage of network 10, the switch 95 is thrown to the lower position as indicated in Fig. 3.

Assuming that the modifying controls 56A and 57A have been set to the proper value for the particular load requirements, normal control action of the controller will, in this system, be indicated by the intermittent blinking of the signal lights 59 and 60. In such case, the changes in the output voltage of the network 10 more or less closely follow the change in output voltage of the network 21A, i. e., balance of demand and input is maintained within suitably close limits. Continuous energization of either the red or green light, after the control point has once been attained, indicates to the operator he must change the relationship between the load and the available input, as above discussed in connection with Fig. 1.

The control system of Fig. 3 may also, for example, be utilized to control an electric furnace generically represented by the block 9B (Fig. 3—B). In this case, the temperature-responsive element for network 10 is resistor 11 of material having a substantial temperature coefficient of resistance, and the electromagnetic device for controlling the input of heat to the furnace may be a contactor 73B whose windings are connected to the L and C terminals, Fig. 3, of the controller 55. The contact structure of contactor 73B is in series with the heater 75 which may supply all or a portion of the heat input to the furnace. For this use of the controllers, the input connections to network 21A as effected by switches 95 and 96, or their equivalent, are as shown in Fig. 3 by unbroken lines. Again, the operator by observation of the signal lights 59, 60 can determine whether or not the controller is operating properly: in this control arrangement, normal operation is indicated by blinking of the light 60, and the need to change the input or load is indicated by continuous illumination of one or the other of lights 59 and 60. The operator may from time to time make an accurate determination of the furnace temperature by actuating the check switch 62 and then effecting a re-balancing adjustment of the network 10. The actual temperature is that indicated by the dial 13 with respect to index 14 when the slidewires 12A and 12B are in position affording darkness of both of the lights 59 and 60.

The controller of Fig. 3 may be also used to maintain a desired low temperature within a freezing or cooling compartment 9C (Fig. 3—C). In this case, also, the condition-responsive element may be a resistor 11 having a suitable temperature coefficient of resistance. The controller 55 may for this use comprise a contactor 73C whose actuating coil is connected to the terminals C and H of Fig. 3. Accordingly, when the temperature within the compartment 9C is high, the winding of contactor 73 is energized under control of the detector relay to effect actuation of the compressor motor 76. For this use of the controller, the connections effected by switches 95 and 96 or their equivalents are those shown by dotted lines in Fig. 3, so that heaters 87, 88, 91, 92 are energized upon closure of relay contacts 50, 52 and so that the output voltage of network 21A simulates, so far as detector 28 is concerned, a reduction in temperature of resistor 11 as eventually actually effected by operation of the compressor motor 76. In this system, proper control action is indicated by intermittent blinking of light 59 and need to change the input or load is indicated by continuous illumination of either of lights 59, 60.

As shown in Fig. 4, the slidewires 12A, 12B of network 10, (Fig. 3) may be rotatably supported by the door 7 of the control cabinet 6, Figs. 2 and 4, which also carries the check switch 61, the power switch 71, the signal lights 59, 60, and the pilot light 72 which when lit illuminates the scale 13. All of the other components of the system of Fig. 3 are mounted upon a chassis disposed within the housing 8 of the controller cabinet. With the door 7 closed, the operator may turn the control unit "on" or "off," actuate the check switch 61 and adjust the knob 12 to set the control point or to read the existing magnitude of the condition under control; he may also, of course, observe the signal and pilot lights 59, 60 and 72. With the door open, as shown in Fig. 4, the operator may adjust any one or more of the controls 56A, 57A and 58 as may from time to time be necessary to suit the controller to the particular conditions of the process or system being controlled, or he may replace any of the plug-in components such as the tubes 29 and 30 and the detector relay.

The control system shown in Fig. 5 is generically the same as that shown in Fig. 1, and is similar to that of Fig. 3 except for differences in the network 21B corresponding with networks 21 and 21A of Figs. 1 and 3 respectively and in other respects specifically discussed. In this modification, the network 21B is a bridge network comprising a slidewire 77 mechanically coupled to the valve or equivalent control device used to vary the agent affecting the magnitude of the condition being controlled. The other two arms of the bridge comprise or include the slidewire 57B manually adjustable to compensate for any droop in the characteristic of the controlled system. This bridge is supplied with alternating current from a suitable source, such as the secondary winding 69 of transformer 66. In operation of the system for control purposes, the output circuit of network 21B is effectively in series with the output circuit of network 10 and the primary winding of the input transformer 31 of detector 28. When it is desired to measure the actual temperature or other condition which has been under control, the voltage of network 21B is effectively removed by closure of contact 61A of the check switch 61. This contact is mechanically coupled to contact 61B to preclude energization of the control motor 73D, or equivalent, during the measurement: opening of contact 61B however does not open the circuits of indicator lamps 59, 60 so that as in the preceding modifications, they may be used in measurement of the temperature when check switch contact 61A is closed.

As shown in Fig. 5A, the motor 73D may be used to change the setting of a valve 74 controlling the supply of fuel to a furnace 9D. Concurrently with re-setting of the valve 74, the slidewire 77 connected by cable 25 to the controller, is adjusted correspondingly to modify the output voltage of the network 21B. The motor 73D may, as shown, be of the capacitor type commonly used for reversible single-phase operation.

In this modification, the signal applied to the detector 28 includes, in addition to the output voltages of networks 10 and 21B, a third alternating current voltage whose phase depends upon the selected direction of rotation of motor 73D. To provide that voltage, there is utilized a transformer 97 whose secondary 99 is in series with the output circuits of networks 10 and 21B and whose primary is connected to those terminals of the field windings 100, 101 of motor 73D which are connected to the reversing switch formed by the relay contacts. The primary winding is of high resistance so that its current is substantially in phase with the voltage across capacitor 102 of the motor which is approximately in quadrature with the line voltage. As the secondary 99 is looking into a high-impedance circuit, its output voltage is approximately in quadrature with the primary current: thus simply by proper poling of the transformer windings or connections thereto, the output voltage of the transformer for either direction of motor 73D will always be of proper phase to oppose the unbalance of network 10 and so avoid overshooting of the proper position of slidewire 77 and the associated valve or other agent-controlling element. As the power demand of transformer 97 is negligible, it may be very small: for example, the primary may be a coil of resistance wire wound on a ceramic form through which a small machine screw has been inserted; the secondary wire is a coil of about 40 turns of #24 wire wound over the primary.

Generally, the same transformer arrangement may be used with a split-field motor in which event the armature is in the lead from the common field terminal to the line terminal C, and capacitor 102 is omitted. In this case, the transformer 97 is preferably a conventional transformer having a closed core and a low resistance primary. Again, no additional phase-shifting networks or devices are required.

To avoid improper energization of the signal lights 59 and 60, or equivalent, and to attain the proper correlation of the signals and the controls, the lights 59, 60 are respectively connected to contacts 51A and 52A insulated from the contacts 51B and 52B used for control of the motor 73D, so that upon movement of contact 50 in one direction, it concurrently engages contacts 51A, 51B, and upon movement in the other direction, it concurrently engages contacts 52A, 52B. In the system of Fig. 5—A, when increased rate of combustion is required, the light 60 is illuminated concurrently with energization of motor 73D for opening of fuel valve 74, and, conversely, when decreased rate of combustion is required, the illumination of light 59 indicates energization of motor 73D for closure of valve 74.

In the system shown in Fig. 5B, the controller of Fig. 5 is used to regulate the temperature of an electric furnace 9E. The motor 73D under control of the detector 28 is used to vary the setting of a variable ratio transformer 78, such as an induction regulator or a taped auto-transformer, thus to change the voltage applied to a heater 75 of the furnace.

The components of the control system of Fig. 5 may be carried by or mounted within a cabinet 6, Figs. 2 and 6, upon whose door 7 are mounted the slidewires 12A and 12B, the network 10, the signal lights 59 and 60, the pilot light 72, the check switch 61 and the power switch 71. All of the other components of the control unit are mounted upon a chassis disposed within the housing 8 of the cabinet. With the door 7 closed, the operator may, as in the controller of Fig. 4, turn the control system "on" or "off," adjust the impedances 12A and 12B for setting of the control point or for measuring the existing magnitude of the condition and may actuate the check switch 61. With the door closed, the signal and pilot lights 59, 60 and 72 are visible through openings in the door 7.

The slidewires 56B and 57B of the network 21B are accessible for readjustment when the door of the unit is open, as shown in Fig. 6. The slidewire 57B may be adjusted to correct for any droop in the control characteristic of the system and the slidewire 56B may be reset to change the throttling range, that is, the range of magnitudes of the controlled condition beyond which one or the other of the signal lights 59, 60 is continuously energized.

As is evident from Figs. 2, 3, 4, 5 and 6, many of the components of the two modifications of the system of Fig. 1 are or may be the same, so that in manufacture either type of controller may be made with the same basic components. Moreover, the door assemblies for both controllers including the signal and pilot lights, the power and check switches, the slidewires and their adjusting knob, scale and index are the same.

It shall be understood the invention is not limited to the circuits and constructions specifically disclosed and that changes and modifications may be made within the scope of the appended claims.

What is claimed is:

1. A control system for maintaining a desired magnitude of a condition and providing for measurement of the actual magnitude of said condition from time to time comprising means for producing a voltage upon departure from said desired magnitude and including a calibrated impedance adjustable to select said desired magnitude, a network for producing a second voltage, a detector jointly responsive to the resultant of said voltages to control an agent in sense to reduce said departure and to control said second network in simulation of the effect of control of the agent, signal devices controlled by said detector to indicate normal and abnormal action of the control system, and means for measuring the magnitude of said condition comprising said calibrated impedance, said signal devices and means for temporarily disabling said network during adjustment of said calibrated impedance to effect null response of said signal devices.

2. A control system for maintaining a desired magnitude of a condition and providing for measurement of the actual magnitude of said condition from time to time comprising means for producing a voltage upon departure from said desired magnitude and including a member adjustable to select said desired magnitude, means for producing a second voltage, a detector jointly responsive to said voltages directly to affect the magnitude of said second voltage and to control an agent in sense to reduce said departure, and means for checking the operation of the control comprising an indicator in circuit with said detector, said calibrated member and means for temporarily removing said second voltage during adjustment of said calibrated member to effect response of said indicator.

3. A control system for maintaining a desired magnitude of a condition and providing for measurement of the actual magnitude of said condition from time to time comprising an electrical network unbalanced upon departure from said desired magnitude to produce a voltage and including a calibrated impedance adjustable to select said desired magnitude, a second electrical network for producing a second voltage, a detector jointly responsive to said voltages directly to affect the magnitude of said second voltage and to control an agent in sense to reduce said departure, and means for intermittently measuring the magnitude of said condition comprising an indicator in circuit with said detector, said calibrated impedance and means for temporarily removing said second voltage during an adjustment of said calibrated impedance to effect response of said indicator.

4. A control system for maintaining a desired magnitude of a condition comprising a network including an impedance responsive to changes in magnitude of said condition, to produce an output voltage upon departure from said desired magnitude, a second network in circuit therewith for producing an output voltage representative of the control action of said system, a detector responsive to the resultant of said voltages including an electronic tube, a relay in the output circuit of said tube effective to vary an agent affecting the magnitude of said condition and to simulate by causing variation of the output voltage of said second network the effect of the variation of the agent, and means for affording "fail-safe" operation of said relay upon interruption of any circuit connections between said networks comprising a source of alternating voltage and a potentiometer for applying a selected fraction of said alternating voltage as biasing voltage to the grid of said tube.

5. A control system for maintaining a desired magnitude of a condition comprising a network including an impedance responsive to changes in magnitude of said condition to produce an output voltage upon departure from said desired magnitude, a source of current for said network, a second network in circuit with said first network for producing an output voltage representative of the control action of said system, a source of current for said second network, a detector responsive to the resultant of said voltages, including an electronic tube, a relay in the output circuit of said tube effective to vary an agent affecting the magnitude of said condition and to simulate by causing variation of the output voltage of said second network the effect of variation of the agent, and means for affording "fail-safe" operation of said relay upon failure of said sources of supply comprising a source of alternating voltage and a potentiometer for applying a selected fraction of said alternating voltage as biasing voltage to the grid of said tube.

6. A control system for maintaining a desired magnitude of a condition comprising a network including an impedance responsive to changes in magnitude of a condition to produce an output voltage upon departure from said desired magnitude, a source of current for said network, a second network in circuit with said first network for producing an output voltage representative of the control action of said system and including thermally-responsive resistors, a source of current for said second network, heaters adjacent said thermally-responsive resistors of said second network, a source of current for said heaters, a detector responsive to the resultant of the output voltages of said networks including an electronic tube, a relay in the output circuit of said tube effective to vary an agent affecting the magnitude of said condition and to simulate by causing energization of said heaters the effect of variation of the agent, and means for affording "fail-safe" operation of said relay upon failure of said first-named current source and either of the other current sources comprising a source of alternating voltage and a potentiometer for applying a selected fraction of said alternating voltage as biasing voltage to the grid of said tube.

7. A control system for maintaining a desired magnitude of a condition comprising an alternating-current network producing an output voltage upon departure from said desired magnitude and whose phase corresponds with the sense of the departure, a reversible alternating-current motor for varying an agent affecting the magnitude of said condition, a detector for controlling said motor and responsive to said voltage, and a transformer having its secondary in circuit with said network and its primary in circuit with said motor for producing an alternating voltage in phase opposition to the output voltage of said network.

8. A control system for maintaining a desired magnitude of a condition comprising an alternating-current network producing upon departure from said desired condition an output voltage whose phase corresponds with the sense of the departure, a reversible alternating-current motor of the capacitor type for varying an agent affecting the magnitude of said condition, a detector for controlling said motor and responsive to said voltage, and a transformer having a secondary winding in circuit with said network and a high-resistance primary winding connected across the capacitor of said motor to produce an alternating voltage in phase opposition to the output voltage of said network.

9. A control system for maintaining a desired magnitude of a condition and providing for measurement of the actual magnitude of said condition from time to time as desired comprising a balanceable electrical network including a calibrated impedance adjustable to balance said network at said desired magnitude, a source of alternating current for energizing said network to produce an alternating output voltage whose phase and magnitude depend upon the sense and extent of departure from said desired magnitude of said condition, a second network and a source of alternating current therefor, a detector jointly responsive to the output voltages of said networks including a relay having contact structure movable in opposite directions from neutral position to control an agent in sense to reduce said departure and to vary the output voltage of said second network in sense to balance the output voltage of said first network, signal devices controlled by said relay to indicate normal and abnormal action of the control, and means for measuring the actual magnitude of said condition at any time comprising said calibrated impedance, said signal devices and means for temporarily disabling said second network during adjustment of said calibrated impedance of the first network to effect null response of said signal devices.

10. A control system for maintaing a desired magnitude of a condition and providing for measurement of the actual magnitude of said condition from time to time as desired comprising a network including a calibrated impedance adjustable to select said desired magnitude and an impedance varying in response to changes in magnitude of said condition to unbalance said network upon departure from said desired magnitude, a second network unbalanced in accordance with supply of an agent affecting said condition, signal devices, a detector jointly responsive to the unbalances of said networks to control the supply of said agent, to vary the unbalance of said second network and to effect actuation of said signal devices for indication of normal and abnormal control action, and means for measuring the actual magnitude of said condition comprising said first network, said detector, said signal devices and switching means for temporarily disabling said second network during adjustment of said calibrated impedance to effect null response of said signal devices.

11. A fail-safe system for maintaining a desired magnitude of a condition comprising a detector including an electronic tube, a source of alternating voltage connected to the anode of said tube, an agent-control relay having contact structure movable in opposite directions from neutral position when the anode current of said tube increases or decreases from a predetermined value, an alternating-current network including a calibrated impedance adjustable to select said desired magnitude and an impedance varying in response to departure therefrom, a second alternating-current network including an impedance varying under control of said relay, connections for applying the algebraic sum of the output voltages of said networks to the signal grid of said tube, and means including a potentiometer and a source of alternating current for applying to said signal grid an alternating voltage of phase and magnitude insuring movement of said contact structure in safe direction when the sum of said output voltages is zero.

12. A control system for automatically controlling an agent between minimum and maximum limits to maintain a desired magnitude of a condition comprising a network unbalanced upon departure from said desired magnitude of the condition to produce an output voltage, a second network for producing an output voltage representative of the control action of said system, a detector upon which the resultant of said voltages is impressed and including an electronic tube, relay means in the output circuit of said tube effective to vary said agent and by causing variation of the output voltage of said second network to simulate the effect of variation of the agent, means providing for "fail-safe" operation of said relay means comprising a source of alternating voltage and a potentiometer for applying a selected fraction of said alternating voltage to the grid of said tube, and a pair of electric signal devices controlled by said relay to effect continuous energization of one of said signal devices when said maximum limit is too low, to effect energization of the other of said signal devices when said minimum limit is too high, and to effect continuous energization of said selected one of said signal devices when said relay means responds solely to said "fail-safe" means.

13. A control system for automatically controlling an agent between minimum and maximum limits to maintain a desired magnitude of a condition, for checking its own operativeness and provided for measurement of the actual magnitude of said condition from time to time comprising a balanceable network including an impedance responsive to changes in magnitude of said condition and a calibrated impedance manually adjustable to balance said network at said desired magnitude, a second network for producing an output voltage representative of the control action of said system, a detector upon which the resultant of said input voltages is impressed and including an electronic tube, relay means in the output circuit of said tube effective to vary said agent and by causing variation of said output voltage of the second network to simulate the effect of variation of said agent, means for affording "fail-safe" operation of said relay comprising a source of alternating voltage, and a potentiometer for applying a selected fraction of said alternating voltage to the grid of said tube, a pair of electrical signal devices controlled by said relay to effect continuous energization of one of the signal devices when said minimum limit is too high, to effect continuous energization of the other of said signal devices when said maximum limit is too low, and to effect continuous energization of a selected one of the signal devices when said relay means responds solely to said "fail-safe" means, and means for temporarily disabling said second network for manual adjustment of said calibrated impedance to measure the actual magnitude of said condition as indicated by null response of said signal devices for the corresponding setting of said calibrated impedance and to detect inoperativeness of said control system as indicated by continued energization of said selected one of said signal devices despite adjustment of said calibrated impedance.

14. A control system for automatic "on-off" control of an agent between minimum and maximum limits to maintain a desired magnitude of a condition, comprising a balanceable network including means for unbalancing it upon departure from said desired magnitude of the condition, a second balanceable network including thermal-responsive devices, a source of heating current for said devices, a detector jointly responsive to the output voltages of said networks including a relay having contact structure movable in opposite directions respectively to effect connection and disconnection of said source of heating current to said thermal-responsive devices for alternately shifting the balance point of said second network in opposite directions and respectively to increase and decrease supply of said agent, and a pair of signal lights selectively energized for said opposite directions of movement of said contact structure, the continuous glowing of one of said lights indicating said maximum limit is too low, the continuous glowing of the other of said lights indicating said minimum limit is too high, and the blinking of said lights indicating said limits are adequate and that both of said networks are properly functioning.

ELWOOD T. DAVIS.

REFERENCES CITED

The following references are of record in the file of this patent:

UNITED STATES PATENTS

| Number | Name | Date |
|---|---|---|
| 2,105,185 | Degnan | Jan. 11, 1938 |
| 2,105,598 | Hubbard | Jan. 18, 1938 |
| 2,154,375 | Chambers | Apr. 11, 1939 |
| 2,325,308 | Davis | July 27, 1943 |
| 2,358,338 | Lilja et al. | Sept. 19, 1944 |
| 2,367,869 | Jones | Jan. 23, 1945 |
| 2,426,711 | Shaffer | Sept. 2, 1947 |
| 2,429,466 | Jones | Oct. 21, 1947 |
| 2,466,702 | Hamby | Apr. 12, 1949 |